Patented May 24, 1932

1,859,512

UNITED STATES PATENT OFFICE

RUSSELL P. HEUER, OF PHILADELPHIA, PENNSYLVANIA, ASSIGNOR TO GENERAL REFRACTORIES COMPANY, A CORPORATION OF PENNSYLVANIA

REFRACTORY AND METHOD OF MAKING IT

No Drawing. Application filed February 22, 1926, Serial No. 89,824. Renewed September 10, 1931.

My invention relates to the manufacture of a refractory containing a considerable amount of magnesia and a very small amount of clay, and with or without chrome ore.

A purpose of my invention is to reduce the requisite amount of clay to a minimum.

A further purpose is to use an electrolyte, preferably sodium dichromate, sodium acid sulphate, or a similar acid electrolyte, to gelatinously coat particles of magnesia with clay.

A further purpose is to gelatinously coat the particles of magnesia with a material adapted to form a bond between the magnesia particles at low temperatures and subsequently bond at high temperatures.

A further purpose is to provide a superior binder between clay and magnesia in the presence of water by a colloidal dispersing agent capable of dispersing the gels clustered about the particles of clay so that they will cluster about the particles of magnesia.

Further purposes will appear in the specification and in the claims.

This invention is a development of the subject matter of my earlier invention, "Brick and cement for furnace use", upon which I have pending U. S. patent application, No. 758,722, filed December 29, 1924.

In this earlier invention I provide a plastic bonding material for use with chrome ore, bonding the chrome ore at low temperatures with a magnesia cement formed by the addition of a salt such as magnesium chloride reactive with magnesia, and subsequently bonding the chrome ore at furnace temperatures with clay and magnesia, preferably using only sufficient magnesia to make unnecessary any considerable addition of clay to the chrome, the composition of the refractory being, for example, perhaps 85% chrome, 10% magnesia and 5% clay, moistened with a suitable small amount of a solution of magnesium chloride or magnesium sulphate.

In the present invention I prefer to use relatively a large proportion of magnesia with or without some chrome ore and with the requisite amount of clay for adequate bonding, the invention being in great measure directed toward lessening the amount of clay requisite for bonding, or to increasing the low temperature bonding of a given small amount of clay.

In the use of the term "magnesia" herein it has been my intention to distinguish from dolomite which contains such a percentage of lime that it will slack in normal temperatures in the presence of moisture. Magnesia, as understood by me, is either without lime content or with so low a content of lime as not to hydrate objectionably and therefore not to shrink upon subsequent heating. I find that 3% of lime, for example, is not objectionable but that 6% or 7% of lime in some samples gives trouble.

The reference to 6% or 7% of lime as objectionable in some samples is given by way of example only, since, especially where a product of high quality is not required, the lime content need not always be held within these limits.

Finely divided clay in water is colloidal in nature, forming a gel which is sticky and which for this reason is a good low-temperature binder. As it is heated the water disappears, and it ceases to be a gel. However, it still continues to stick. With increasing temperatures its bonding quality rises.

In the presence of water the particles of the clay are surrounded by gel.

Apparently the addition of an acid electrolyte, (of which sodium dichromate and sodium acid sulphate appear to be most suitable), very efficiently disperses the gel from the clay and that if magnesia be present, the electrolyte disperses the gel previously surrounding the particles of clay and this gel reforms around the particles of the magnesia. This takes place whether chrome ore be present or not.

Since the formation of gel is a function of the surface and extends to approximately the same depth whatever the size of particle, division of the clay into finer particles results in a larger percentage of the total quantity of clay being available as a gel; and if this could be carried to its theoretical limit the entire clay content could be transformed into gel and would be available for dispersion and reformation leaving no ungelated clay in the mixture. This is impossible for the several reasons that the clay cannot be practically uniformly enough sub-divided to this extent and the distribution of the clay cannot be made uniform enough to give the required quantity of clay at one part of the mixture without an excess at another. I aim to approach the theoretical minimum as closely as is practicable.

Very fine sub-division of the clay and uniform distribution of it greatly improve the percentage of clay capable of being dispersed and the effectiveness of whatever dispersion of colloidal gel takes place.

The exact theory underlying my invention is not clear. The fact that by far the best results are attained with acid electrolytes suggests that the acidity of the electrolyte along with its greater affinity for the clay which is not gelled causes it to disperse the acid gel and that the dispersed acid gel then unites with the basic magnesia to cluster about its exposed particles as it has previously clustered about the clay.

Whatever the fact as to this my experiments have indicated that acid electrolytes, particularly sodium dichromate and sodium acid sulphate are much more effective as bonding agents than neutral electrolytes and very much more effective than basic electrolytes. However, even basic electrolytes cause some bonding and are capable of the use indicated in this application.

The chrome ore is relatively neutral as compared with the basic magnesia. It is probably for this reason that the dispersed gel coats the particles of magnesia rather than the particles of chrome ore when the latter is present. The chrome ore appears to function largely as a desirable refractory nonreactant diluent where the diluent is desired.

The gel-coated magnesia bonds the particles of chrome ore and the limit of dilution permissible is reached when the quantity of gelled magnesia is small enough or its distribution poor enough so that it no longer sufficiently performs this function.

Chrome ore contains, as impurities, silicates of magnesia and of alumina which may be made to act like clay. Silicate impurities in the chrome ore are almost always hydrated, but this is not essential to obtain advantage from the impurities. From this standpoint the addition of chrome ore may be regarded as similar to the addition of clay and the quantity of active chrome ore impurities which is so added may be utilized to reduce the quantity of added clay required.

Except from these standpoints, the danger of excessive dilution on the one hand and the possibility of advantageous use of chrome ore impurities to reduce the quantity of added clay required, the presence or absence and the quantity (if present) of chrome ore seem to make little difference.

The high-temperature-bonding between the clay and the magnesia takes place (that is, begins) at a relatively low temperature by reason of the extreme fineness of division of the clay particles forming the gel around the particles of magnesia.

The refractory material may be formed into brick or used as a plaster in the molding of a furnace bottom and is intended to be dried with or without heat or to be fired, as preferred.

Without the clay there would be some initial low temperature bond, but the clay increases the initial low temperature bond and forms at high temperature a strong bond instead of a poor bond that would exist at high temperature if the clay were not present.

The clay without the electrolyte would form some bond during intermediate temperatures, but this bond would be initially too low unless the amount of clay used were made disadvantageously high.

The dispersion of the clay by means of the electrolyte distributes it in the form of a sticky gel around the particles of magnesia with the result that there is an adequate bond at low temperatures even when the amount of clay is very small, as for example, 4%. A small amount of colloidal clay well dispersed upon the surface of the magnesia as a condensing agent or precipitant makes a very much better low temperature bond than would a larger amount of clay in its normal or commonly occurring state. In the high temperature bonding restriction of the clay to a small quantity is essential and by my invention the quantity required for low temperature bonding has been brought within the low range of that which is effective for high temperature bonding.

Different dispersion agents may be used. Of those that I have tried, as stated, acid electrolytes have been most effective, sodium dichromate, nitre cake and chromic acid giving good results either separately or together. I have obtained good results with quantities of electrolyte varying from 1% to 4% of the total weight of refractory.

In view of my invention and disclosure, variations and changes will doubtless become evident to others skilled in the art, and I therefore claim all such in so far as they fall within the reasonable spirit and scope of my invention.

Having thus described my invention, what I claim as new and desire to secure by Letters Patent is:—

1. A step in the process of forming a magnesia refractory from magnesia free from or low in lime and a small amount of finely divided clay containing colloidal material in the presence of water, which consists in dispersing the clay gels by a dispersing agent in the presence of magnesia so that the gels cluster about the particles of magnesia.

2. A step in the process of making magnesia refractory from magnesia free from lime or containing insufficient lime to hydrate objectionably, and a small amount of clay containing colloidal material and water, which consists in dispersing the colloid by a dispersing agent.

3. A step in the process of making magnesia refractory from magnesia free from or low in lime and a small amount of clay containing colloidal material and water, which consists in dispersing the colloidal clay in the presence of the magnesia by means of an acid electrolyte.

4. A step in the process of making magnesia refractory from magnesia free from or low in lime and a small amount of clay containing colloidal material and water, which consists in dispersing the colloidal clay in the presence of the magnesia by means of sodium acid sulphate.

5. A step in the process of making refractory from magnesia free from or low in lime, a small quantity of clay containing colloidal material and water, which consists in dispersing the colloidal clay in the presence of the magnesia by means of a sodium acid electrolyte.

6. A magnesia refractory formed from a mixture comprising particles of magnesia free from lime or containing insufficient lime to hydrate objectionably, and at least partially surrounded by a thin coating of an acid clay gel.

7. A magnesia refractory formed from a mixture comprising finely divided magnesia and chrome ore in less amount than magnesia, the megnesia being surrounded by a small amount of acid clay gels.

8. A magnesia refractory formed from a mixture comprising magnesia and chrome ore in less amount than magnesia, an appreciable small quantity of clay and an acid electrolyte.

9. A magnesia refractory formed from a mixture comprising magnesia and chrome ore in less amount than magnesia, an appreciable small quantity of clay and sodium acid sulphate.

10. A magnesia refractory formed from a mixture comprising magnesia and chrome ore in less amount than magnesia, the chrome ore containing hydrated silicates as impurities, an an acid electrolyte.

11. A magnesia refractory formed from a mixture comprising magnesia and chrome ore in less amount than magnesia, the chrome ore containing hydrated silicates as impurities, and sodium acid sulphate.

12. An artificial mixture of magnesia free from or low in lime, a small amount of clay and a dispersing agent for colloids, the clay containing material which is precipitated around the particles of the magnesia.

13. A magnesia refractory formed from a mixture comprising a quantity of magnesia which is free from or is low in lime, an appreciable small quantity of clay and an acid electrolyte.

14. A magnesia refractory formed from a mixture comprising a quantity of magnesia free from or low in lime, an appreciable small quantity of clay and sodium acid sulphate.

RUSSELL P. HEUER.